United States Patent [19]
Bradt

[11] Patent Number: 5,800,765
[45] Date of Patent: *Sep. 1, 1998

[54] DOUBLE DOCTOR BLADES

[75] Inventor: Rexford H. Bradt, Warsaw, Ind.

[73] Assignee: Materials Research Innovations Corporation, Warsaw, Ind.

[*] Notice: The term of this patent shall not extend beyond the expiration date of Pat. No. 5,500,175.

[21] Appl. No.: 617,618

[22] Filed: Mar. 19, 1996

[51] Int. Cl.$^6$ ........................................ B29C 53/02
[52] U.S. Cl. ................................. 264/282; 264/286
[58] Field of Search .................... 264/211.12, 282, 264/283, 285, 286

[56] References Cited

U.S. PATENT DOCUMENTS 4,422,892  12/1983  Plant ............................ 156/209
4,717,329   1/1988  Packard et al. ................ 425/328
5,500,175   3/1996  Bradt ............................ 264/151

Primary Examiner—Mark Nagumo
Attorney, Agent, or Firm—Roger M. Rickert

[57] ABSTRACT

A material transfer arrangement having a pair of generally cylindrical adjacent rolls which are counter-rotatable about their respective cylindrical axes and which define therebetween a nip between which material passes is disclosed. There is a corresponding pair of spaced apart doctor blades, each in close proximity to a corresponding one of the rolls so that material may be conveyed between the roll nip and the space between the doctor blades. In one form, the nip passes material to the space between the doctor blades and that space has a downstream restriction which causes the material to compress in an accordion-like way forming a corrugated material web. In another form, the doctor blades function to deliver thermoplastic extrudate to the nip between the rolls to form elongated sheets or webs of plastic material of improved uniformity.

6 Claims, 3 Drawing Sheets

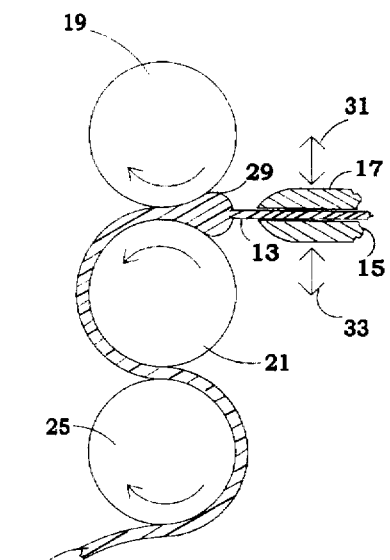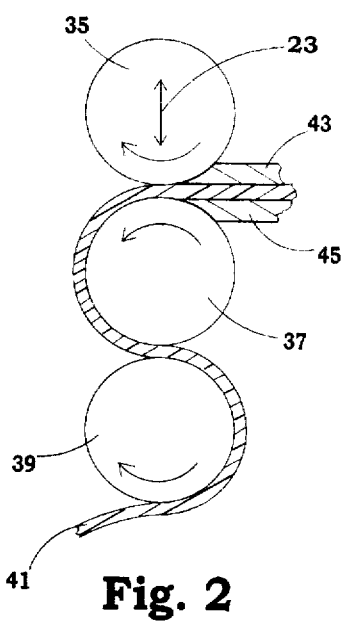
Fig. 1
(prior art)
Fig. 2

DOUBLE DOCTOR BLADES

SUMMARY OF THE INVENTION

The present invention relates generally to applications of doctor blades to nips between rollers and more particularly to a pair of such doctor blades which function as a die lip for delivery of molten plastic material into the in-running nip of a paired roll press unit, or to a pair of such doctor blades which provide a controlled crepeing of preformed film webs, metal foils and the like.

In my application for U.S. Pat. No. 333,504 filed Nov. 2, 1994, now U.S. Pat. No. 5,500,175, granted Mar. 19, 1996, the entire disclosure of which is specifically incorporated herein by reference, there are disclosed film or sheet handling processes involved in several techniques for the manufacture of hopper feedable plastic pellets, for example, for use in making fibrous reinforced injection molded parts. These techniques typically produce pellets containing fibers of a length greater than the largest linear dimension of such pellets. The techniques may utilize a pair of doctor blades in close proximity to the nip between a pair of counter-rotating rollers to corrugate or crepe long fiber strands within the pellet-forming plastic. This prior application does not address the crepeing or corrugating of web or sheet materials for other than plastic pellet formation. The present invention applies some of these techniques to corrugate or crepe materials other than fiber reinforcing strands as well as to provide delivery of molten plastic material to calendering rolls or similar pair of press rolls.

Sheet forming extrusion dies are becoming increasingly complex as designers strive to improve uniformity of sheet thickness and quality of molecular orientation within thicker sheeting. Very thin sheet or film when not uniform in thickness causes hard and soft areas in the tensely wound rolls. A small increase of, for example, 0.0005 inches in a film having a total thickness of 0.002 to 0.004 inches can cause unacceptable roll quality and printability problems as well as problems in handling such film. A hard ridge in a roll of film can increase the likelihood of blocking or fusion of adjacent layers and/or impair guiding of such webs.

To give greater control of extrusion die lips and consequent extrudate uniformity, some quite complex mechanisms have long been used by industries. For example, the use of flexible die lips combined with closely spaced adjustment bolts that enabled thickness adjustment was introduced in the early or mid 1970's and called "flexi-lip" extrusion die. One subsequent improvement on this concept used adjustment bolts which were cored to accept electric heaters each of which was independently under the control of a complex control system which measured web caliper and, by adjusting heat input, caused the bolt to thermally expand or contract thereby varying the film thickness as desired. This improvement system, while quite successful, the complexity adds to both cost and maintenance as well as not providing some desirable features.

Among the several objects of the present invention may be noted the provision of a die lip arrangement for delivering molten plastic material into the in-running nip of a paired roll press unit which overcomes the above-noted prior art disadvantages.

In the manufacture of crepe paper, a thin web of wet paper is transferred to the surface of a heated rotating drum. A doctor blade (stationary scraper) engages the paper causing it to wrinkle as it leaves the drum surface. The thus "creped" paper is then conveyed to an oven for additional drying. The moistened paper corrugation process in common use today relies on the adherence of the paper to a driven roll and depends on the balancing of the roll adherence and driving force with the stiffness of the web being creped or pushed off by a single doctor blade. A controlled crepeing of preformed webs and metal foils which do not adhere to a driven roll can not be achieved by the known technique. The controlled crepeing of materials which do not adhere to a driven roll is another object of the present invention.

The forgoing as well as other objects and advantageous features of the present invention will be in part apparent and in part pointed out hereinafter.

In general, a machine for press roll forming extruded thermoplastic webs includes in addition to an arrangement for extruding a thermoplastic material, a pair of generally cylindrical adjacent press rolls which are counter-rotatable about their respective cylindrical axes and have a nip between which the thermoplastic material may be passed. There is a corresponding pair of extruder die portions, each engaging a respective one of the press rolls. These die portions form a conduit for conveying the thermoplastic material from the extruding arrangement to the roll nip.

In contrast to the flexi-lip systems, the present invention does not require bolts because the rolls themselves contact the flexible or otherwise movable doctor blades pressing them together to control the caliper of the film or web being formed. Since the rolls are very strong, the load deflections very predictable and the "crown" of the rolls is precisely given, the use of double doctoring flexible lip units can greatly improve and simplify sheet manufacture extrusion dies. The die lips do not function as sheet forming units, the rolls themselves perform that function.

Also in general and in one form of the invention, a method of and machine for forming a continuous web of corrugated material has supplied thereto a continuous substantially linear web of sheet material. The web is moved in the direction of web elongation along a path at a first velocity. The motion of the web is impeded at a preferred location along the path so that web velocity along the path subsequent to the preferred location is less the first velocity along the path prior to the preferred location so as to increase the cross-sectional area and deform the web from its linear shape and induce a serpentine or corrugated web configuration. In one embodiment, there is a pair of input pinch rollers between which the elongated web of sheet material moves and a flow restrictive output die in the form of a pair of doctor blades or lips from which the elongated web of sheet material moves. Motion impediment occurs intermediate the input rollers and the output die to compressing the web in its direction of elongation thereby corrugating or crepeing the sheet material.

By using flexible double doctoring lips which contact and seal to the surface of the sheet finishing roll stack and entering well into the roll nip, the melt is delivered directly into the nip and not allowed to form a rolling bead that is exposed to air and that encourages entrapment of surface held air as microbubbles and as an oxidizing agent.

The double doctoring techniques of the present invention achieve crepeing of a non-adhering film web or metal foil by balancing the stiffness of a positively delivered web against an adjustable exit dam which may be either positively adjusted or be yieldably held in opposition to the pressure generated by the delivered web to give any desired degree of compaction.

BRIEF DESCRIPTION OF THE DRAWING

FIG. 1 is a side elevation view partially in cross-section of a prior art sheet die and roll stack arrangement;

FIG. 2 is a side elevation view partially in cross-section of a double doctoring melt feed die and roll stack arrangement according to the present invention in one form;

Corresponding reference characters indicate corresponding parts throughout the several views of the drawing.

Figure 3:
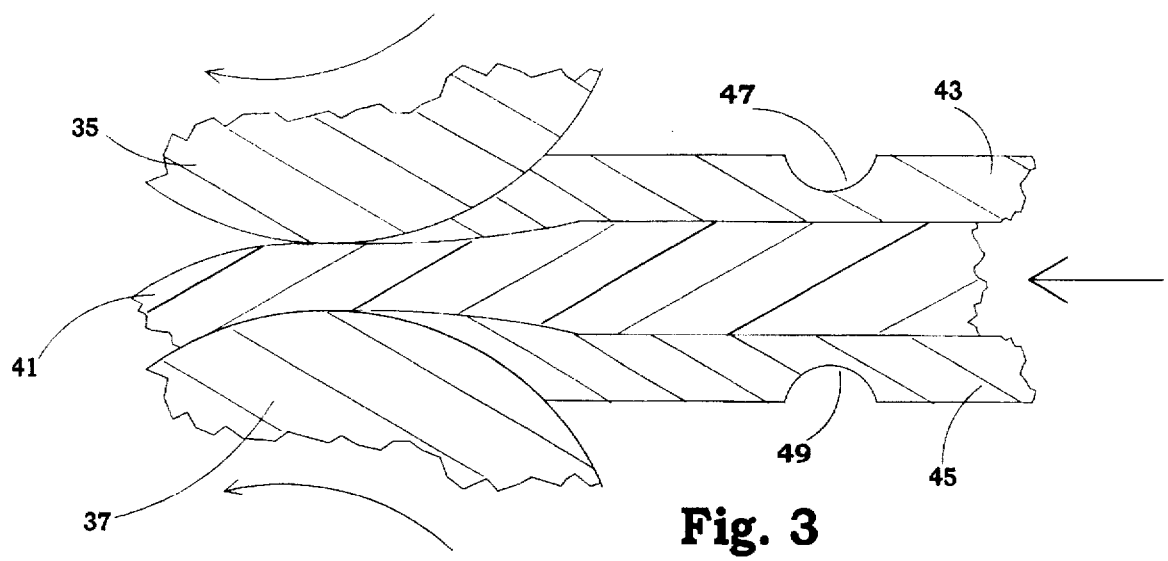
FIG. 3 is an enlarged cross-sectional view of the double doctoring melt feed die and roll nip of FIG. 2.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

In FIG. 1, a standard sheet die has lips 15 and 17 which deliver a stream of extrudate 13 to the nip between rollers 19 and 21 of a conventional roll stack. The sheet or web 27 is cooled and finished by the several rolls 19, 21 and 25 in the stack. An undesirable bead 29 of plastic extrudate typically builds up at the entrance to the nip between rolls 19 and 21. The die lips may be rigid, or may be flexible as indicated by the arrows 31 and 33. Flexible die lips combined with closely spaced adjustment bolts that enabled thickness adjustment was introduced in the early or mid 1970's and called "flexi-lip" extrusion die. A later development on this concept used adjustment bolts which were cored to accept electric heaters each of which was independently under the control of a complex control system which measured web caliper and, by adjusting heat input, caused the bolt to thermally expand or contract thereby varying the film thickness as desired. By using flexible double doctoring lips 43 and 45 of FIG. 2 which contact and seal to the surface of the sheet finishing rolls 35 and 37 and which entering well into the roll nip, the melt is delivered directly into the nip and not allowed to form a rolling bead like 29 in FIG. 1 that is exposed to air and that encourages entrapment of surface held air as microbubbles and as an oxidizing agent.

In FIG. 2, a material transfer arrangement for conveying extrudate from an extruder to the roll stack is seen to include first and second generally cylindrical adjacent rolls 35 and 37. The roll 35 and 37, and the rolls 37 and 39 are counter-rotatable about their respective cylindrical axes such as 23 and defining therebetween a nip between which the extruded plastic material may be passed. The die lips 43 and 45 are formed as a pair of spaced apart doctor blades, each in close proximity to a corresponding one of the rolls for conveying extruded plastic material to the roll nip from those space between the doctor blades.

The machine of FIG. 2 is designed to press roll form extruded thermoplastic webs such as 41 and includes a conventional extruder (not shown) or similar means for extruding a thermoplastic material. The die portions 43 and 45 form a conduit for conveying the thermoplastic material from the extruding means to the roll nip. The lips 43 and 45 may comprise flexible die lips as better seen in FIG. 3.

In FIG. 3, it will be noted that each die portion includes a concave end which engages the corresponding press roll, the concave end has the same radius of curvature as the corresponding cylindrical press roll to thereby conform to the press roll surface. The die portions 43 and 45 and corresponding rolls 35 and 37 engage one another along this common radius of curvature. Thus, the movable lips sealingly engage the corresponding press rolls.

Figure 4:
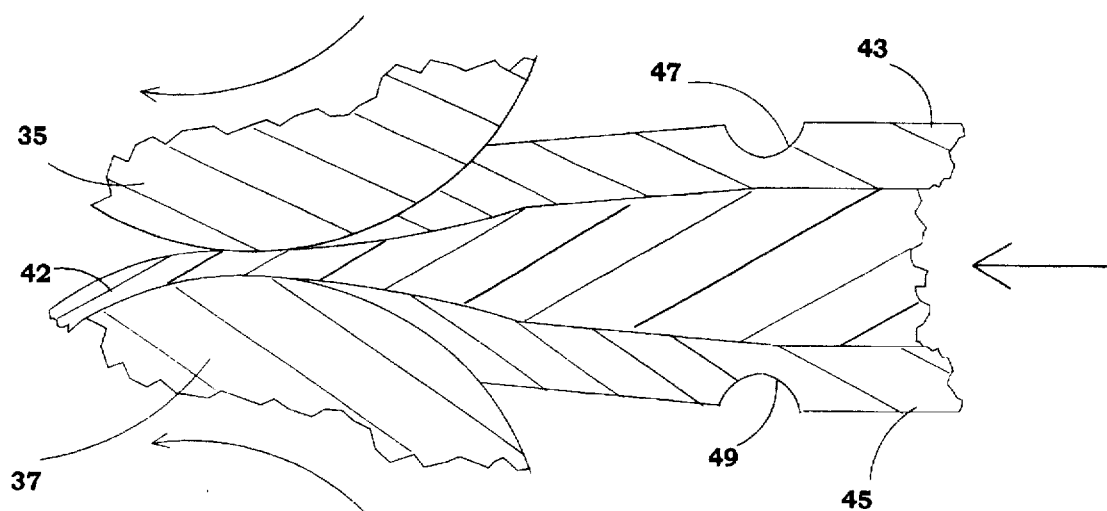
FIG. 4 is an enlarged cross-sectional view similar to FIG. 3, but illustrating exaggerated adjustment to illustrate the control of web thickness.

In FIGS. 1–4, the press roll axes are generally parallel to one another. In FIG. 1, the thickness of the web 27 was controlled by moving the lips 15 and 17 toward and away from one another. In FIGS. 2–4, the rolls 35 and 37 may be moved toward and away from one another while maintaining the parallel relationship between their axes and while the movable lips remain in sealing engagement with the corresponding press rolls, thereby also moving the die portions to vary the cross-sectional area of the die opening, the volume of extrudate supplied to the press roll nip, and the resulting web thickness. Comparing FIGS. 3 and 4, the rolls 35 and 37 have been moved nearer to one another in FIG. 4 collapsing the concavely curved free ends of the lips toward one another and reducing the web thickness to that illustrated at 42. This flexibility of the lips 43 and 45 may be enhanced by flex grooves such as 47 and 49. A pair of side plates (not shown) confine the extrudate in the horizontal direction orthogonal to its direction of motion. These plates may be similar to the side dams described in my above-mentioned application.

Figure 5:
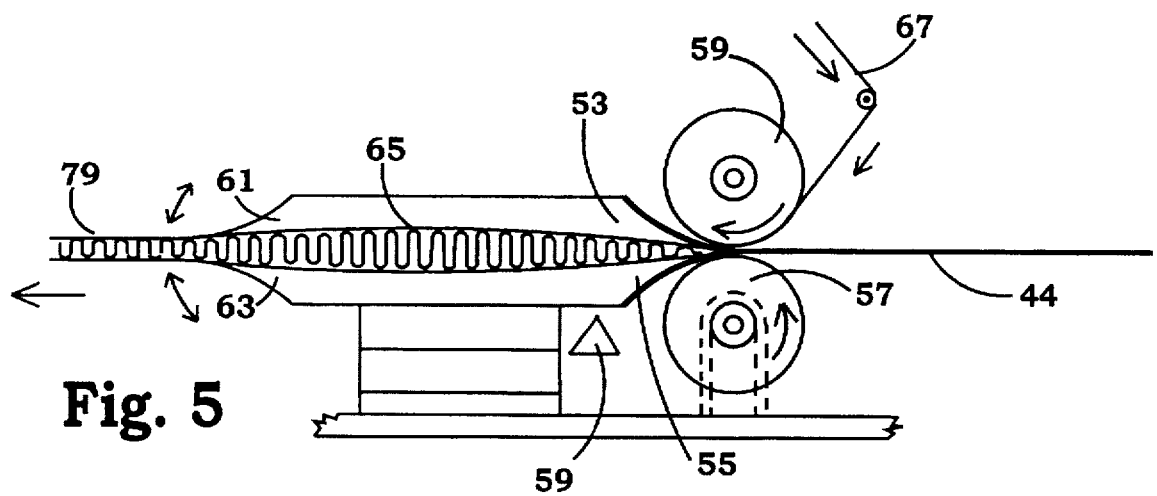
FIG. 5 is a somewhat schematic side elevation illustration of apparatus for corrugating or crepeing web material according to the present invention in one form.

In FIG. 5, the concept of adjacent doctor blades cooperating with the nip between counter-rotating rolls is utilized to crepe or corrugate incoming sheet material 44. In FIG. 5, a pair of crowding doctor blades 53 and 55 are located near the outrunning nip of rollers 57 and 59 with each doctor blade being positioned closely adjacent the surface of a corresponding pinch roller. A web 44 of sheet material is passed between the rollers 57 and 59. As used herein, "sheet material" includes metal foil, paper or plastic webs and similar sheet stock. The doctor blades 53 and 55 serve in this embodiment not only to force the web from the surfaces of the pinch rollers, but also to confine the web above and below as it passes toward and eventually between a pair of flexible lips 61 and 63 at the opposite end of a chamber 65. A pair of side plates (not shown) confine the web in the horizontal direction orthogonal to its direction of motion. These plates may be similar to the side dams described in my above-mentioned application. Also, the plates may taper toward one another to retard web motion through the chamber 65. Both the flexible lips 61 and 63, and the tapered sides contribute retarding forces on the web and contribute to the accordion-like folding of the web As with all the disclosed embodiments, the corrugated output web from the lips 61 and 63 may be re-reeled for later use. Optionally, one or more lamination webs such as 67 may also be fed to the nip between rollers 57 and 59 if desired. Such webs may provide reinforcing layers, adhesive layers, or offset printed designs as examples. Also, one or both of the double doctoring blades may be heated as illustrated at 69 to slightly soften the folded edges of thermoplastic film or thermoplastic film coated papers to enable the crepe-folding of papers having a brittle and stiff coating which might, if unheated, break, but when thus creped provides a very stiff yet expandable structure or can produce a compacted sheet structure having fused and bonded edges of a unique structured product. Metallic foils may similarly be creped to form useful items either alone or when suitably laminated to other yieldable webs.

Figure 6:
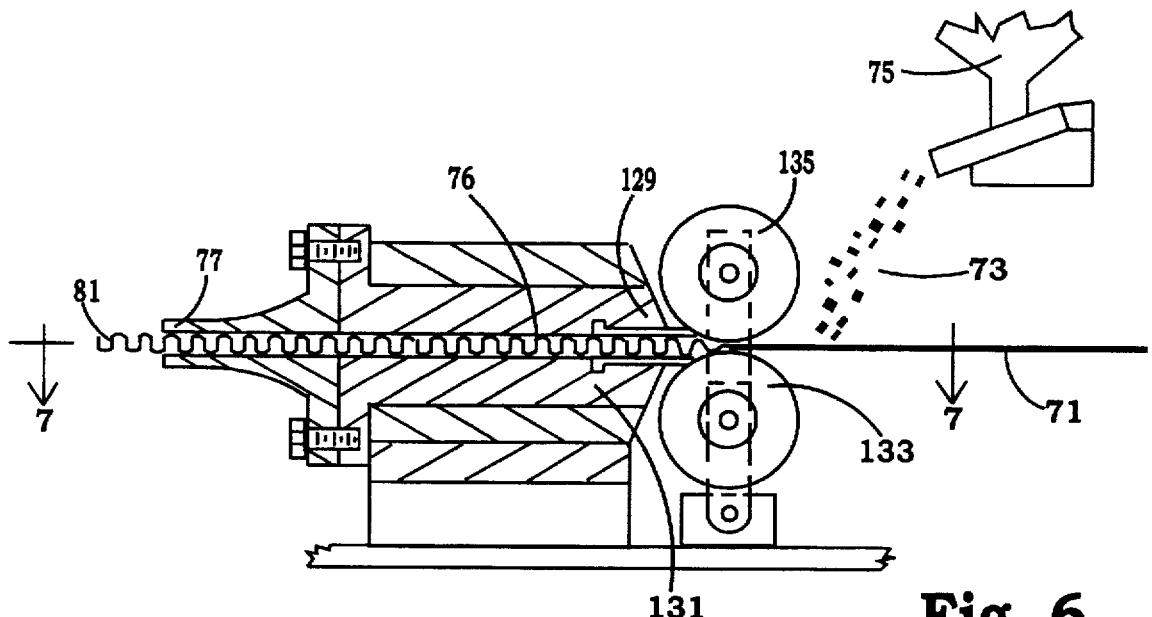
FIG. 6 is a somewhat schematic side elevation illustration of apparatus employing a single pair of feed rolls and a relatively fixed pair of doctor blades for crepeing a continuous web of material.
Figure 7:
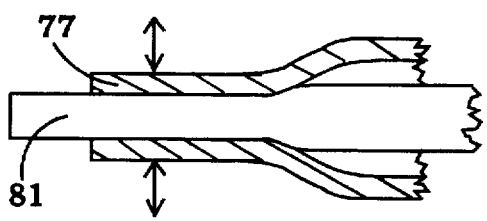
FIG. 7 is a view in cross-section along lines 7—7 of FIG. 6.

In my above-mentioned application, a structure similar to that depicted in FIGS. 6 and 7 has a heated strand die which is assembled to a heatable compartment defined, in part, by the relatively fixed pair of doctor blades 129 and 131. In FIG. 6, such heating is optional. Also optional is the hopper 75 and the application of a release agent, bonding agent, colorant or similar additive 63. One or more lamination webs like 67 of FIG. 5 is also optional. Here, the crowding doctor blades are fixed relative to one another and movable together relative to the pair of rollers 133 and 135. The pair of doctor blades and the pair of rollers are relatively biased toward one another as by a spring, fluidic cylinder or similar arrangement. As illustrated, the pair of rolls 133 and 135 are movable together horizontally relative to the doctor blade pair. The two rolls are spring biased toward one another and the upper roll 135 pivots relative to the lower roll to compensate for thickness variations in the incoming web 71. Thus, as web thickness increases, roll 135 moves upwardly and counterclockwise to provide the wider nip and to maintain contact with the crowding doctor blade 129. The sheet material 71 accumulates in a chamber 76 because of flow restricting output die 77 functions as a dam to impede the material from exiting the chamber 76. The die 71 may comprise an adjustable restriction in the web path which is mechanically controlled to expand or contract as illustrated by the arrows in FIG. 7 rather than being resiliently flexible as was the case in FIG. 5.

FIGS. 5–7 illustrate machines for producing corrugated sheet material where a source of an elongated web of sheet material 44 or 61 moves between a pair of input pinch rollers 57 and 59 or 133 and 135. In each embodiment, there is a flow restrictive output die 61 and 63, or 77 from which the elongated web of sheet material (in its corrugated form) moves. In each case, there is a confining compartment 65 or 76 intermediate the input rollers and the output die for compressing the web in its direction of elongation thereby corrugating the sheet material. In each case, the sheet material 44 or 71 is continuous and essentially straight when it enters between the input pinch rollers and the sheet material remains continuous but with substantial portions extending obliquely to the direction of web elongation when it passes from the output die as illustrated at 79 or 81. In each case, the flow restrictive output die functions as an exit dam and impedes the motion of the web at a its preferred location along the path so that web velocity along the path subsequent to the preferred location is less the first velocity along the path prior to the preferred location and the mass flow rate of the web along the path prior to the preferred location is substantially the same as the mass flow rate of the web subsequent to the preferred location so as to increase the cross-sectional area and deform the web from its linear shape. In FIG. 5, the flow restrictive output die 61, 63 comprises a resilient restriction in the web path while in FIGS. 6 and 7, the flow restrictive output die comprises an adjustable restriction in the web path.

In summary, the invention has a number of advantages over known prior devices. Direct contact between the lips 43 and 45 and their respective rolls 35 and 37 avoids the problem created when the extrudate is exposed to air between the extruder die and the rolls as well as those created by the buildup of a bead of plastic at the nip. Controlled crepeing allows formation of corrugated materials which would otherwise not adhere to the forming roll with sufficient force to allow crepeing by traditional techniques.

From the foregoing, it is now apparent that novel arrangements utilizing double doctor blade concepts have been disclosed meeting the objects and advantageous features set out hereinbefore as well as others, and that numerous modifications as to the precise shapes, configurations and details may be made by those having ordinary skill in the art without departing from the spirit of the invention or the scope thereof as set out by the claims which follow.

What is claimed is:

1. The method of forming a continuous web of corrugated material comprising the steps of:

supplying a continuous elongated web of material;

moving the web in the direction of web elongation along a path between a pair of cylindrical rollers at a first velocity;

impeding the motion of the web at a preferred location along the path by positioning a pair of crowding doctor blades at the nip between the pair of rollers with each doctor blade closely adjacent the surface of a corresponding one of said rollers to receive the web from between the rollers, and restricting the web progress as it exits from between the pair of doctor blades so that web velocity along the path subsequent to the preferred location is less than the first velocity along the path prior to the preferred location so as to increase the cross-sectional area in a plane perpendicular to the direction of web elongation and deform the web.

2. The method of claim 1 wherein the mass flow rate of the web along the path prior to the preferred location is substantially the same as the mass flow rate of the web subsequent to the preferred location.

3. The method of claim 1 wherein the step of restricting is performed by a resilient doctor blade exit dam.

4. The method of claim 1 wherein the step of restricting is performed by an adjustable doctor blade exit dam.

5. The method of claim 1 wherein the step of impeding includes the step of confining the web in directions orthogonal to its direction of motion.

6. The method of forming a continuous web of corrugated material comprising the steps of:

supplying a continuous elongated web of material;

moving the web in the direction of web elongation along a path between a pair of cylindrical rollers at a first velocity;

impeding the motion of the web at a preferred location along the path by positioning a pair of crowding doctor blades near the nip between the pair of rollers with each doctor blade contacting the surface of a corresponding one of said rollers to receive the web from between the rollers and restrict the web progress as it exits from between the pair of doctor blades thereby causing the web to wrinkle folding the material.

* * * * *